United States Patent
Hsia et al.

(10) Patent No.: US 6,512,782 B1
(45) Date of Patent: Jan. 28, 2003

(54) MULTIPULSE DYE LASER

(75) Inventors: James C. Hsia, Weston, MA (US); Anthony D. Quaglia, Marlborough, MA (US); Charles Johnson, Northboro, MA (US); Mike Clancy, Westford, MA (US)

(73) Assignee: Candela Corporation, Wayland, MA (US)

( * ) Notice: Subject to any disclaimer, the term of this patent is extended or adjusted under 35 U.S.C. 154(b) by 0 days.

(21) Appl. No.: 09/528,866

(22) Filed: Mar. 20, 2000

Related U.S. Application Data

(63) Continuation-in-part of application No. 09/455,264, filed on Dec. 6, 1999, now Pat. No. 6,364,872.

(51) Int. Cl.$^7$ .................................................. H01S 3/10
(52) U.S. Cl. ................................................ 372/25; 372/22
(58) Field of Search ......................... 372/25, 22; 606/9, 606/8

(56) References Cited

U.S. PATENT DOCUMENTS

| | | | | |
|---|---|---|---|---|
| 3,914,648 A | * 10/1975 | Friedman et al. | ......... | 315/241 P |
| 4,150,342 A | 4/1979 | Johnston, Jr. et al. | .. | 331/94.5 S |
| 4,398,129 A | 8/1983 | Logan | ......... | 315/208 |
| 4,469,991 A | * 9/1984 | McAllister | ......... | 315/246 |
| 4,611,270 A | 9/1986 | Klauminzer et al. | ......... | 364/183 |
| 4,627,063 A | * 12/1986 | Hosokawa | ......... | 372/38.03 |
| 4,823,354 A | 4/1989 | Znotins et al. | ......... | 372/57 |
| 4,829,262 A | 5/1989 | Furumoto | ......... | 330/4.3 |
| 4,891,817 A | 1/1990 | Duarte | ......... | 372/54 |
| 5,023,865 A | 6/1991 | Grant et al. | ......... | 370/3 |
| 5,054,028 A | 10/1991 | Esherick et al. | ......... | 372/32 |
| 5,255,274 A | 10/1993 | Wysocki et al. | ......... | 372/26 |
| 5,287,380 A | 2/1994 | Hsia | ......... | 372/69 |
| 5,315,607 A | 5/1994 | Nielsen | ......... | 372/38 |
| 5,373,515 A | * 12/1994 | Wakabayashi et al. | ......... | 372/20 |
| 5,598,426 A | 1/1997 | Hsia et al. | ......... | 372/53 |
| 5,624,435 A | 4/1997 | Furumoto et al. | ......... | 606/10 |
| 5,746,735 A | 5/1998 | Furumoto et al. | ......... | 606/9 |
| 5,871,479 A | 2/1999 | Furumoto et al. | ......... | 606/9 |
| 5,921,981 A | 7/1999 | Bahmanyar et al. | ......... | 606/4 |
| 6,130,900 A | 10/2000 | Black et al. | ......... | 372/25 |
| 6,364,872 B1 | * 4/2002 | Hsia et al. | ......... | 606/9 |

* cited by examiner

*Primary Examiner*—Paul Ip
*Assistant Examiner*—Jeffrey Zahn
(74) *Attorney, Agent, or Firm*—Testa, Hurwitz & Thibeault, LLP

(57) ABSTRACT

A method for generating a long effective pulse duration output beam of laser radiation using a flashlamp-excited dye laser is described. A spaced series of excitation pulses is electronically generated using a pulse forming module. The series of excitation pulses are provided to a flashlamp-excited dye laser, which generates an output beam of laser radiation. The output beam is comprised of a series of spaced micropulses of laser radiation which, in combination, provide a long effective pulse duration.

16 Claims, 6 Drawing Sheets

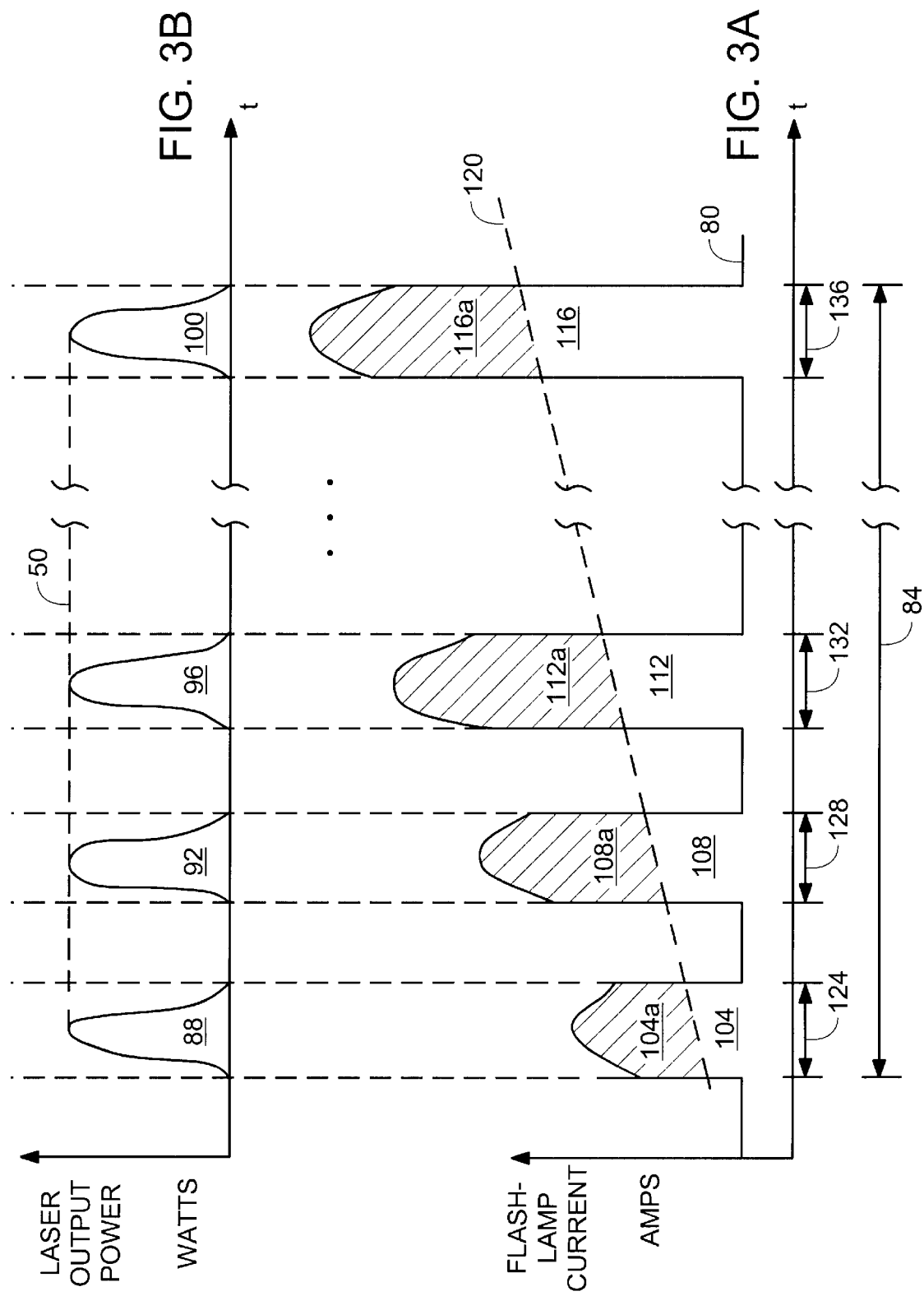

MULTIPULSE DYE LASER

CROSS-REFERENCE TO RELATED APPLICATION

This application is a continuation-in-part of U.S. patent application Ser. No. 09/455,264 which was filed on Dec. 6, 1999 now U.S. Pat. No. 6,364,872.

FIELD OF THE INVENTION

The present invention relates generally to the field of lasers. More specifically, this invention relates to a method and laser apparatus for producing a pulsed output beam of laser radiation having a long effective pulse duration.

BACKGROUND OF THE INVENTION

Facial telangiectasia (i.e., abnormal, dilated blood vessels) is a somewhat common occurrence in individuals with fair skin. Individuals having facial telangiectasia often seek cosmetic treatment for these vessels. The flashlamp-excited pulsed dye laser is an established device for the treatment of various cutaneous vascular lesions including facial telangiectasia. When treated with such a dye laser, most vessels can be cleared with a single treatment, and nearly all vessels can be cleared within three treatments.

Flashlamp-excited pulsed dye lasers used for treatment of facial telangiectasia (and various cutaneous vascular lesions) typically operate at a wavelength between 585 and 600 nanometers (nm) and a pulse duration of 450 microseconds ($\mu$sec) to 1.5 milliseconds (msec). One of the treatment side effects particularly bothersome to patients is acute post-treatment purpura (i.e., superficial hemorrhage characterized by blue/black discoloration). Purpura is always bothersome, particularly when it appears on the face. Purpura can take one to three weeks to fully resolve and is often quite disruptive in a person's work and social schedules. The acceptance of dye laser treatment would be considerably enhanced if purpura could be minimized or eliminated.

The cause for purpura in pulsed dye laser treatment of vascular lesions is generally thought to be caused by the extravasation of blood components from the rupture of the skin's microvasculature, due to the rapid vessel heating produced by the relatively short pulse duration of the laser. Researchers have conjectured that if the pulse duration of the dye laser could be lengthened to a duration that is short compared to the thermal relaxation time of the abnormal vessels but long compared with the thermal relaxation time for the normal microvasculature, then the rupture of these vessels could be minimized or avoided. (Anderson, R. R. "Laser-Tissue Interactions," Goldman, M. P., Fitzpatrick, R. E., Cutaneous Laser Surgery (St. Louis, Mosby, 1994), pp. 9–11.)

Various lasers currently used to treat facial telangiectasia generate a continuous pulse having a long pulse duration (i.e., greater than 10 msec). For example, the Aura™ laser (manufactured by Laserscope, Inc. of San Jose, Calif.) and the Versapulse™ laser (manufactured by Coherent, Inc., Medical Group, of Santa Clara, Calif.) are both solid-state lasers capable of generating output beams having a 10–20 msec pulse duration. Little or no purpura has been observed using these lasers. However, the depth of penetration of the output beam from these solid-state lasers is less than that of a pulsed dye laser beam due to the shorter wavelength (i.e., 532 nm). There is also stronger melanin absorption in the skin at this shorter wavelength. Consequently, the efficacy in treating deeper and larger telangiectasias is reduced when using one of these solid-state lasers.

The difficulty in forming a continuous output pulse having a long pulse duration with a flashlamp-excited dye laser is that accumulation of dye molecules in metastable electronic states, thermal distortions in the liquid dye medium (i.e., the gain medium) and photodegradation of the dye all can cause the laser action (i.e. lasing) to self-terminate. This self-termination occurs when the lasing threshold (i.e., the excitation energy level at which laser action occurs) rises due to these conditions. With a constant amplitude excitation pulse, when the lasing threshold rises above the amplitude of the excitation pulse, lasing terminates.

U.S. Pat. No. 5,287,380 discloses a method of generating an excitation pulse with a ramped amplitude to extend the duration of the output beam of a flashlamp-excited pulsed dye laser. U.S. Pat. No. 5,598,426 discloses a ramping technique in which the amplitude of the excitation pulse changes in coordination with the lasing threshold to achieve an output beam pulse of extended duration. These patents describe methods that extend the pulse duration of the output beam to about 2 milliseconds. U.S. Pat. No. 5,746,735 describes optically combining the output beams of multiple lasers to obtain an output beam having a pulse duration of at least one millisecond. However, this technique requires 1 to 2 lasers for each millisecond of pulse duration.

A principle object of the present invention is to provide a flashlamp-excited pulsed dye laser having a long effective pulse duration (e.g., on the order of 5 to 40 milliseconds) so as to effectively treat facial telangiectasia (and various other cutaneous vascular lesions) with reduced post-treatment purpura.

SUMMARY OF THE INVENTION

The invention relates to an apparatus and method for generating an output beam of laser radiation having a long effective pulse duration (e.g., on the order of 5 to 40 milliseconds). For certain applications, a long effective laser pulse duration is desirable to allow thermal diffusion to occur during the time of laser energy deposition. An example is treating facial telangiectasia effectively while avoiding purpura. Another example is laser cutting and welding of metals and non-metals. While preferred embodiments include a flashlamp-excited pulsed dye laser, the principles of the invention can be advantageously applied to any laser with a dynamically increasing lasing threshold. Lasers with dynamically increasing lasing threshold include all lasers in which the lasing transition terminates in an energy level with appreciable thermal population. An example is the holmium laser operating near 2 micron wavelength. In this case, the lasing threshold increases during a laser pulse due to the increase in lower laser level population caused by the increase in temperature of the lasing medium. The principles of the present invention can also be advantageously used when the desired laser pulse duration is difficult to generate because the excitation energy required to maintain the laser above lasing threshold for the entire pulse is too great.

A laser incorporating the principles of the invention generates an output beam comprised of a series of micropulses of laser radiation. The series of micropulses constitute an output beam having a long "effective" pulse duration that has been shown to be effective in therapeutic treatment of cutaneous vascular legions while minimizing the undesired side effects of purpura or other hyper-, hypo-pigmentation abnormalities.

In one aspect, the invention features a method of generating a pulsed output beam of laser radiation having a long effective pulse duration in a flashlamp-excited dye laser. This method includes the steps of providing a plurality of energy storage devices, charging each energy storage device to a different energy level using a single power supply, generating electronically a spaced series of excitation pulses by discharging the energy storage devices, driving the flashlamp-excited dye laser with the series of excitation pulses, and producing an output beam comprised of a series of spaced micropulses of laser radiation which, in combination, have a long effective pulse duration. In another aspect, the method includes the steps of generating electronically a spaced series of excitation pulses, driving the flashlamp-excited dye laser with the series of excitation pulses, producing an output beam comprised of a series of spaced micropulses of laser radiation, measuring a portion of the output beam transmitted through a wavelength filter and adjusting a tuning element in response to the measured portion of the output beam. In another aspect, the method includes the steps of generating electronically a spaced series of excitation pulses, driving the flashlamp-excited dye laser with the series of excitation pulses, producing an output beam comprised of a series of spaced micropulses of laser radiation, and directing the output beam of laser radiation to a target using a flexible aiming device.

In one embodiment, each pulse within the spaced series of excitation pulses has an amplitude that increases in coordination with an increasing lasing threshold for the flashlamp-excited dye laser. In another embodiment, a tuning element is adjusted in coordination with each pulse within the spaced series of excitation pulses to vary the wavelength of each micropulse. In another embodiment, the effective pulse duration of the output beam is at least 5 milliseconds. In another embodiment, each micropulse has a pulse duration of at least 10 microseconds. In another embodiment, each micropulse delivered to the skin has a fluence less than 5 j/cm$^2$. In another embodiment, the series of micropulses delivered to the skin has a total fluence greater than 6 j/cm$^2$. In another embodiment, each micropulse has an energy level that is less than half of the total energy of the series of micropulses. In another embodiment, the series of micropulses has a total energy greater than 1 Joule. In another embodiment, the output beam of laser radiation is directed at the skin of a patient to treat a cutaneous vascular lesion. In another embodiment, the pulse parameters are selected to minimize the formation of purpura. In another embodiment, the effective pulse duration of the output beam is between about 5 milliseconds and about 40 milliseconds. In another embodiment, the output beam of laser radiation is aligned with the target using an aiming beam. In another embodiment, the aiming beam has a wavelength in the green region.

In another aspect, the invention features a flashlamp-excited dye laser for producing a pulsed output beam having a long effective pulse duration. The laser includes a power supply, a pulse forming module, a flashlamp and a lasing medium. The power supply is configured to charge a plurality of energy storage devices to different energy levels. The pulse forming module is electrically connected to the power supply and generates a series of spaced excitation pulses by discharging the energy storage devices. The flashlamp is electrically connected to the pulse forming module and receives the series of spaced excitation pulses. The flashlamp uses the excitation pulses to produce a series of light pulses. The lasing medium can include a liquid dye mixture. The liquid dye medium receives the series of light pulses from the flashlamp and produces an output beam comprised of a series of spaced micropulses of laser radiation which, in combination, have a long effective pulse duration.

In another aspect, the laser includes a pulse forming module, a flashlamp, a lasing medium a feedback module and a tuning element. The pulse forming module is electrically connected to the power supply and generates a series of spaced excitation pulses. The flashlamp is electrically connected to the pulse forming module and receives the series of spaced excitation pulses. The flashlamp uses the excitation pulses to produce a series of light pulses. The lasing medium can include a liquid dye mixture. The liquid dye medium receives the series of light pulses from the flashlamp and produces an output beam comprised of a series of spaced micropulses of laser radiation which, in combination, have a long effective pulse duration. The feedback module measures a portion of the output beam transmitted through a wavelength filter. The tuning element is in communication with feedback module and varies the wavelength of each micropulse in response to the measured portion of the output beam.

In another aspect, the laser includes a pulse forming module, a flashlamp, a S lasing medium and a flexible aiming device. The pulse forming module is electrically connected to the power supply and generates a series of spaced excitation pulses. The flashlamp is electrically connected to the pulse forming module and receives the series of spaced excitation pulses. The flashlamp uses the excitation pulses to produce a series of light pulses. The lasing medium can include a liquid dye mixture. The liquid dye medium receives the series of light pulses from the flashlamp and produces an output beam comprised of a series of spaced micropulses of laser radiation which, in combination, have a long effective pulse duration. The flexible aiming device is connected to the lasing medium, receives the output beam of laser radiation and directs the output beam to a target.

In one embodiment of the laser, each pulse within the spaced series of excitation pulses is generated with increasing amplitude in coordination with an increasing lasing threshold for the flashlamp-excited dye laser. In another embodiment, a tuning element is adjusted in coordination with each pulse within the spaced series of excitation pulses to vary the wavelength of each micropulse. In another embodiment, the effective pulse duration of the output beam is at least 5 milliseconds. In another mbodiment, each micropulse has a pulse duration of at least 10 microseconds. In another embodiment, each micropulse has an energy level less than half of the total energy of the series of micropulses. In another embodiment, the series of micropulses has a total energy greater than 1 Joule. In another embodiment, the output beam of laser radiation is used to treat a cutaneous vascular lesion on a patient's skin. In another embodiment, the flashlamp-excited dye laser includes an aiming beam for aligning the output beam of laser radiation with the target. In another embodiment, the aiming beam has a wavelength in the green region.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIGS. 3A and 3B are graphical illustrations of a series of excitation pulses and the corresponding output beam in accordance with the invention.

DETAILED DESCRIPTION

Figure 1:
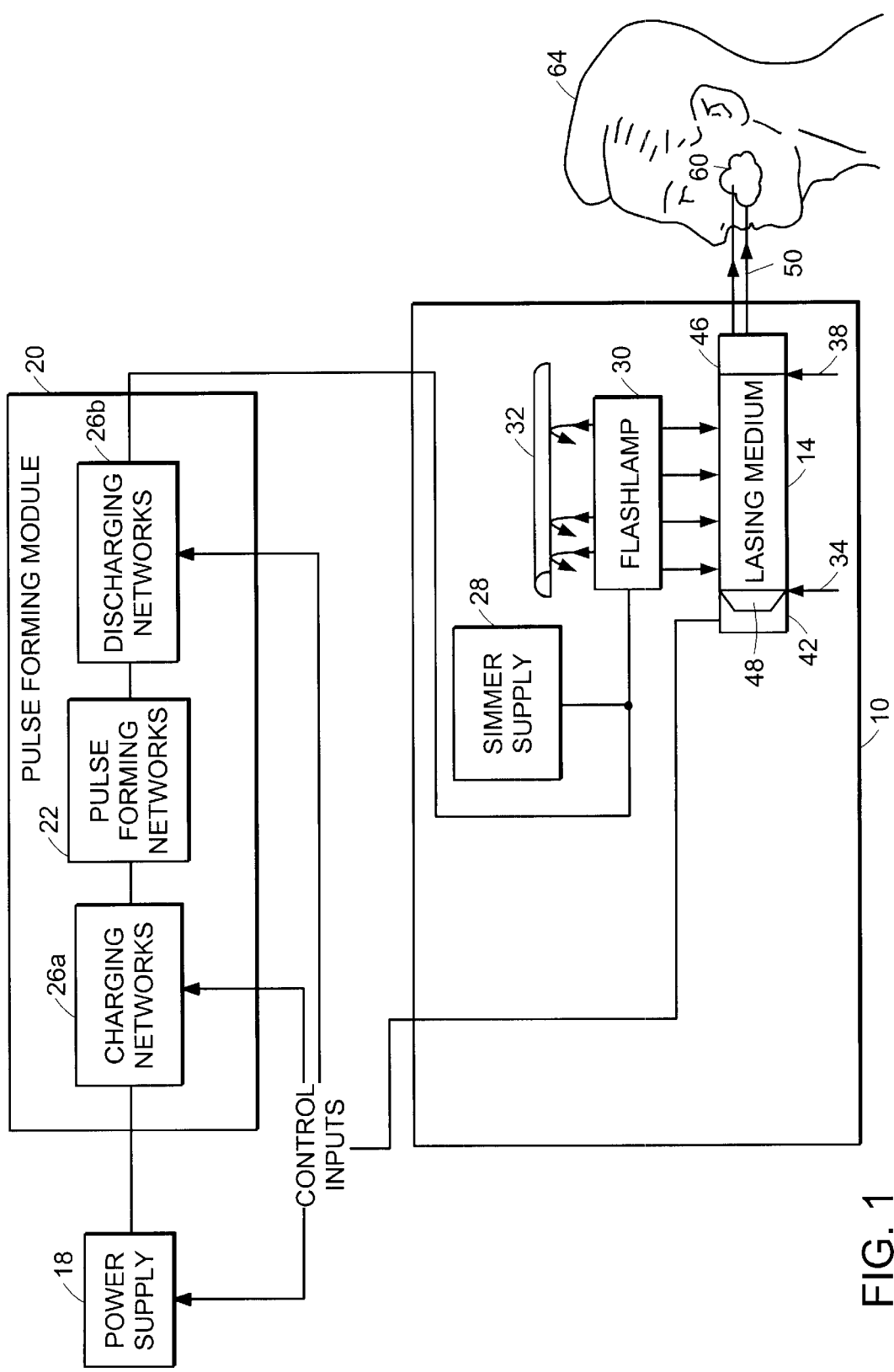
FIG. 1 is a block diagram of an embodiment of a multipulse dye laser according to the invention.

FIG. 1 depicts a laser system 10 incorporating the principles of the invention. The laser system 10 includes a lasing medium 14 comprising an elongated dye cell in which a dye carried by a liquid is dissolved. The lasing medium 14 preferably is maintained at a uniform and constant temperature. A pulse forming module 20 includes pulse forming networks 22, charging networks 26A and discharging networks 26B. The pulse forming networks 22 generate a spaced series of excitation pulses (described in more detail below). The pulse forming module 20 applies each excitation pulse through the respective discharging networks 26B, to a flashlamp 30 to excite the lasing medium 14. The power supply 18 provides the energy to the pulse forming networks 22. The charging networks 26A regulate the amount of energy delivered to each pulse forming network 22. A simmer supply 28 supplies a low level current 80 (FIG. 3A) to the flashlamp 30 to develop a significant level of ionization in the flashlamp prior to discharge of the flashlamp.

Each pulse generated by the pulse forming module 20 is discharged through the flashlamp 30, producing a pulse of light of high intensity. More specifically, the high intensity light emanating from the flashlamp 30 is directed to the lasing medium in the dye cell 14. A reflector 32 can be used to direct the light to the dye cell. In one embodiment, the reflector 32 encircles the flashlamp 30 and the lasing medium 14. The reflector 32 can be made from a white ceramic material. Using a ceramic reflector 32 provides the following advantages: ceramic is resistant to yellowing from light exposure and ceramic can be made into the desired shape prior to firing, so that cost is minimized.

The lasing medium can include a liquid dye mixture. The light from the flashlamp 30 is absorbed by the lasing medium 14 causing dye molecules to move from the ground state to excited singlet states. As the excited molecules return to the ground state, photons of a particular wavelength are emitted. Some of the light emanates from apertures 34, 38 located at each end of the dye cell 14. First and second mirror assemblies 42, 46, in combination, constitute an optical system for the laser. The first mirror assembly 42 is fully reflective and returns emanated light back into the dye cell.

The first mirror assembly 42 can include a wavelength tuning element 48 to tune the output beam within the gain bandwidth of the dye solution. The are several tuning techniques known in the art of dye lasers. For example the tuning element 48 can be an intracavity element such as a grating, prism or etalon. In another embodiment, the tuning element 48 can be a control device that controls the concentration of the dye solution. The wavelength tuning element 48 reduces the bandwidth of the beam and can be used to match the wavelength of the laser to the absorption spectrum of the target to enhance the desired physiological effects. As the target cells and surrounding cells heat up, their respective absorption spectra change. In one embodiment, the wavelength of each micropulse is changed to match the peak in the absorption spectrum of the target cells. In that embodiment, the tuning element 48 is in communication with a synchronizer 182 (FIG. 4) and the synchronizer 182 transmits a series of trigger signals to the tuning element 48. In response to the trigger signals, the tuning element 48 adjusts the wavelength for each subsequent pulse in the spaced series of micropulses of laser radiation 104, 108, 112, 116.

A second mirror assembly 46 is partially transmissive, returning a portion of the emanated light and allowing the remaining portion to exit the cell. The light resonates between the first and second mirror assemblies 42, 46 and increases in intensity when lasing threshold is reached. At that point, a measurable amount of light passes through the second mirror assembly 46 as a pulsed output beam 50. The output beam 50, which is comprised of a spaced series of micropulses of laser radiation 88, 92, 96, 100 (FIG. 3B), can be aimed at a cutaneous vascular legion 60 (e.g., facial telangiectasia) of the patient 64 being treated.

Figure 2A:
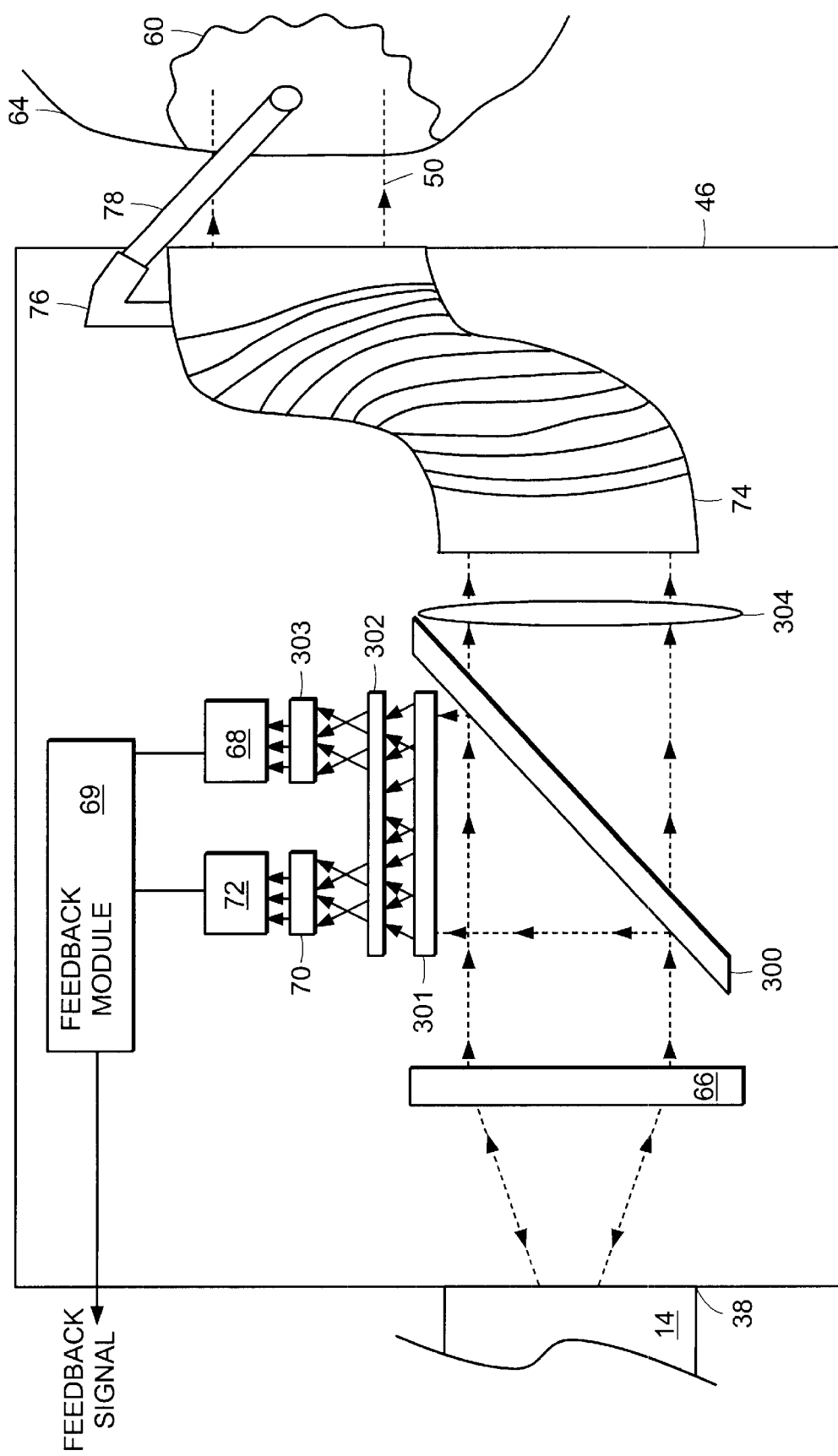
FIG. 2A is a block diagram of an embodiment of a mirror assembly of a multipulse dye laser according to the invention.

FIG. 2A is a detailed representation of the second mirror assembly 46 used in the laser 10. The emanated light passes through the aperture 38 at the end of the dye cell 14 to a partially reflective mirror 66. The mirror 66 reflects a portion of the light back into the dye cell 14 and transmits a portion of the light to a broadband beamsplitter 300. The small amount of reflected light from the beamsplitter 300 is incident on a scatter disc 301, which in one embodiment is made from a ceramic material. The light scattering through the disc is optionally attenuated with a neutral density filter 302. The light transmitted through the filter 302 is incident on two separate filter/detector pairs. The first pair has a neutral density filter 303 and a first detector 68. The second pair has a wavelength filter 70 and a second detector 72. The wavelength filter 70 provides wavelength dependent transmission of light through it. In one embodiment, the wavelength filter 70 is glass doped with a rare earth material, for example Praseodymium and Neodymium. In another embodiment, the wavelength filter 70 is a dielectric coated optic. The neutral density filter 302, in one embodiment, is designed to have the same transmission as the wavelength filter 70 at the desired wavelength. The first detector 68 and the second detector 72 are in electrical communication with a feedback module 69. In one embodiment, the first and second detectors 69, 72 measure the intensity of the light.

The wavelength filter 70 permits transmission of light based on a function that is dependent on the wavelength of that light that passes through the wavelength filter 70. This function is represented as a curve, shown graphically in FIG. 2B. The feedback module 69 is programmed with the function of transmission dependent on the wavelength of the light. The feedback module 69 divides the measurement of the second detector 72 by the measurement of the first detector 68 to determine the amount of light transmitted $T_0$ through the wavelength filter 70. Using the curve of FIG. 2B, the feedback module 69 uses the point where the calculated amount of light transmitted $T_0$ intercepts the curve to determine the wavelength $\mu_0$ of the output beam. When the calculated amount of light transmitted changes, for example from $T_0$ to $T_1$, the feedback module uses the function to determine that the wavelength of the output beam has changed from $\lambda_0$ to $\lambda_1$.

Figure 2B:
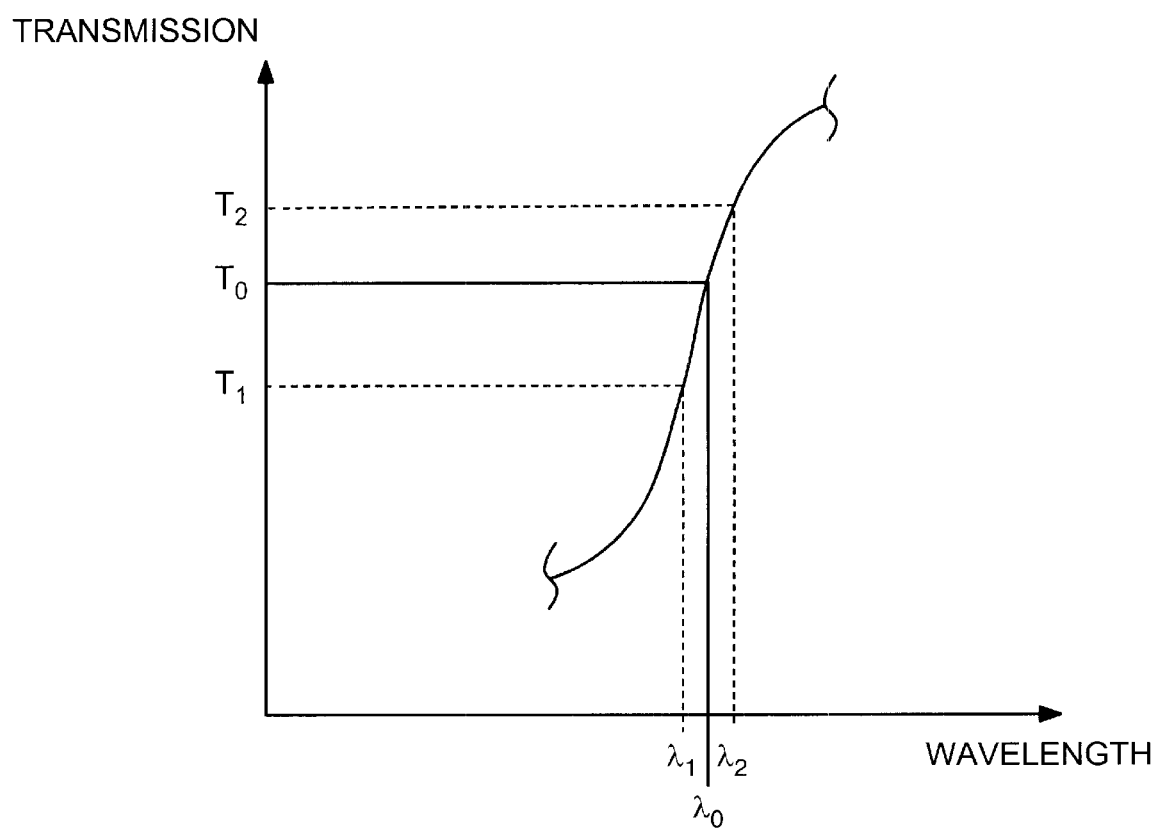
FIG. 2B is a graphical illustration of an embodiment according to the invention of a function of transmission of light through a rare earth doped color filter dependent on wavelength.

The slope of the curve is dependent on the doping materials of the wavelength filter 70. A wavelength filter 70 is chosen to provide a transmission function having a steep slope around the operating wavelength of the laser 10. For example, flashlamp-excited pulsed dye lasers used for treatment of facial telangiectasia (and various cutaneous vascular lesions) typically operate at a wavelength between 585 and 600 nim. For the dye laser, a wavelength filter 70 is chosen to provide a transmission function having a steep slope at the wavelength range between 585 and 600 nm. As shown in FIG. 2B, a steep slope causes small changes in wavelength to result in large changes in transmission. This allows the feedback module 69 to quickly and easily identify changes in wavelength and send an adjustment to the tuning element 48. This feedback system (e.g., 48,68,69,70,72) can keep the wavelength of the output beam 50 to a desired tolerance of +/−1 nm.

Referring again to FIG. 2A, the light passes through optional lenses 304 to a 20 flexible aiming device 74. The flexible aiming device 74 allows the user to direct the output beam 50 wherever the user desires without regar d to the position of the dye cell 14. The flexible aiming device 74 does not alter the wavelength. In one embodiment, the flexible aiming device 74 is constructed from a fiber optic cable. In another embodiment, the flexible aiming device has an attached aiming beam device 76. The aiming beam device 76 produces an aiming beam 78. The aiming beam 78 shows the user where the output beam 50 is aimed. In one embodiment, the aiming beam has a wavelength in the green region, approximately 490 nm to 550 nm. The green wavelength region is used because light in that wavelength range does not disperse on skin cells as much as light in other color ranges. This allows the spot size of the aiming beam to be visibly accurate. In one embodiment, the spot size of the aiming beam is the same as the spot size of the output beam 50. In another embodiment, the aiming beam 78 is always present. The user can aim the flexible aiming device 74 until the aiming beam 78 is located directly on the spot the user wants the output beam 50. Once appropriately aimed, the user initiates the triggering of the pulsed output beam 50.

FIG. 3A depicts a graph of the generated excitation pulses 104, 108, 112, 116. FIG. 3B depicts a graph of the output beam 50 corresponding to a series of micropulses 88, 92, 96, 100. The horizontal axes for both FIG. 3A and FIG. 3B represent time. The vertical axis of FIG. 3A represents the electric current for driving the flashlamp; in this embodiment, current measured in amperes. The vertical axis of FIG. 3B represents power of the output beam; in this embodiment, power measured in watts.

The output beam 50 has an effective pulse duration 84 as shown in FIGS. 3A and 3B. The effective pulse duration 84 is defined as the time from the start (i.e., rising edge) of the first micropulse of laser radiation 88 to the end (i.e., falling edge) of the last micropulse of laser radiation 100. Thus, the output beam 50 is not a continuous pulse of laser radiation, but a time spaced series of micropulses of laser radiation 88, 92, 96, 100.

The number and amplitude of the excitation pulses 104, 108, 112, 116 determine the number and amplitude of micropulses of laser radiation 88, 92, 96, 100. The spacing between the micropulses of laser radiation 88, 92, 96, 100 does not necessarily have to be uniform. In other words, the spacing between the series of excitation pulses 104, 108, 112, 116 can be varied in any way to accomplish the user's goals.

Each excitation pulse 104, 108, 112, 116 (FIG. 3A) is formed using the pulse forming networks 22 and the charging and discharging networks 26A, 26B, as described in more detail below. In one embodiment, each excitation pulse has more energy than the previous pulse in coordination with an increasing lasing threshold 120. In other embodiments, the amplitude of each excitation pulse 104, 108, 112, 116 can vary as needed to accomplish various treatment goals. For example, the amplitude of each excitation pulse is coordinated to be greater than the increasing lasing threshold 120. In another embodiment, where the amplitude of each excitation pulse is nearly similar, the duration of each excitation pulse can be increased.

The increasing lasing threshold 120 is dependent on a variety of factors (as discussed above). In general, the increase in lasing threshold 120 for a dye laser is proportional to the total excitation energy delivered to the dye medium. This energy is, in turn, proportional to the product of the excitation power and the excitation time duration. For a laser incorporating the principles of the invention, the excitation time corresponds to the sum of the excitation times 124, 128, 132, 136 for each of the micropulses of laser radiation 88, 92, 96, 100. Because this sum is significantly shorter than the long effective pulse duration 84, the lasing threshold 120 increases slowly (i.e., smaller slope) relative to traditional continuous pulsed dye lasers.

In one exemplary embodiment, the laser 10 generates four pulses, each with a pulse duration 124, 128, 132, 136 of 100 microseconds. Each pulse is spaced so that the time period from the start of the first pulse 88 until the end of the last pulse 100 (i.e., the long effective pulse duration 84) is 10 milliseconds. This output beam has a long "effective" pulse duration (i.e., 10 milliseconds), but an actual total "on" time of only 400 microseconds.

The use of an output beam comprised of a series of micropulses not only helps improve the lasing threshold 120, but also makes the laser more energy efficient. The amount of excitation energy converted to output pulse energy corresponds to the sum of the amount of energy of each excitation pulse 104a, 108a, 112a, 116a above the lasing threshold 120. A known pulsed dye laser requires excitation energy throughout the entire pulse duration of the output beam. None of the excitation energy below the lasing threshold 120 is converted to output laser radiation. In contrast, the present invention requires excitation energy only when forming each micropulse (i.e., no excitation energy is required between the excitation pulses 104, 108, 112, 116), except for the nominal simmer current 80. Thus, a laser incorporating the principles of the invention requires less excitation pulse energy to deliver an output beam containing the same amount of laser radiation energy as known pulsed dye lasers. Therefore, a laser incorporating the principles of the invention is more efficient.

Figure 4:
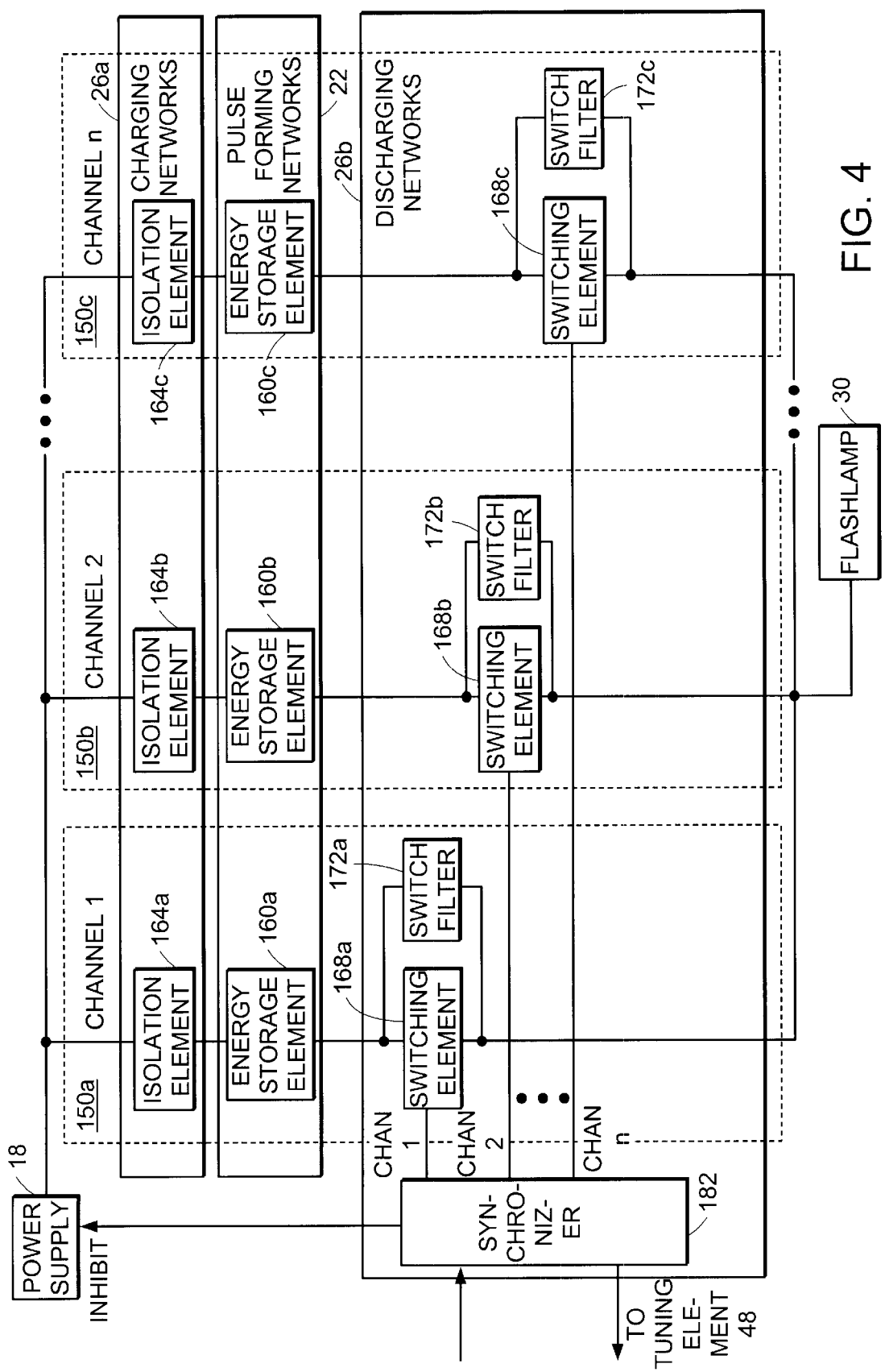
FIG. 4 is a block diagram of an embodiment of a pulse forming module according to the invention.

FIG. 4 is a detailed representation of the pulse forming networks 22 and the charging and discharging networks 26A, 26B used in the laser 10 to form the desired spaced series of excitation pulses 104, 108, 112, 116. The pulse forming networks 22, the charging networks 26A and the discharging networks 26B have a plurality of channels 150a, 150b, 150c, each channel corresponding to the creation of a single excitation pulse. For example, channel one 150a corresponds to the first excitation pulse 104 (FIG. 3B), channel two 150b corresponds to the second excitation pulse 108 (FIG. 3B) and channel n 15Oc corresponds to the nth or last excitation pulse 116 (FIG. 3B).

In the pulse forming networks 22, each channel is a separate pulse forming network (e.g. channel 1, channel 2, channel n) and includes an energy storage element 160 (e.g., a capacitor). The storage element 160 is charged by the power supply 18 prior to the initiation of the spaced series of excitation pulses 104, 108, 112, 116. In one embodiment, if the lasing threshold 120 increases, each subsequent excitation pulse needs to have a correspondingly higher amplitude. In another embodiment, each excitation can have a different amplitude dependent upon the treatment procedure goals. To accomplish this, each storage element 160 has a different value of capacitance such that a constant voltage from the power supply 18 stores different energies in each channel, as required to meet the treatment goals. In one embodiment, if the storage element is a capacitor, an inductive element (not shown) is positioned between the pulse forming module 20 and the flashlamp 30. If different values of capacitance are used, the pulse width of each excitation pulse can vary.

Figure 5A:
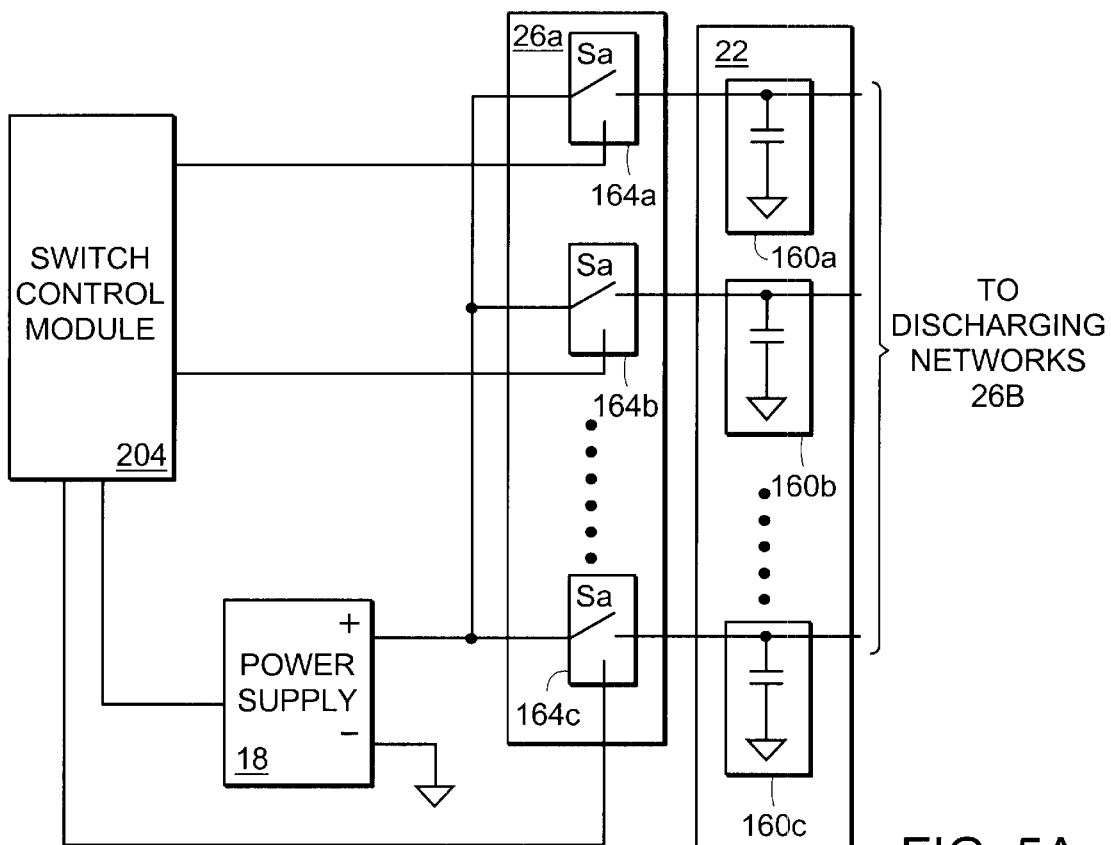
FIG. 5A is a block diagram of an embodiment of a power supply according to the invention.
Figure 5B:
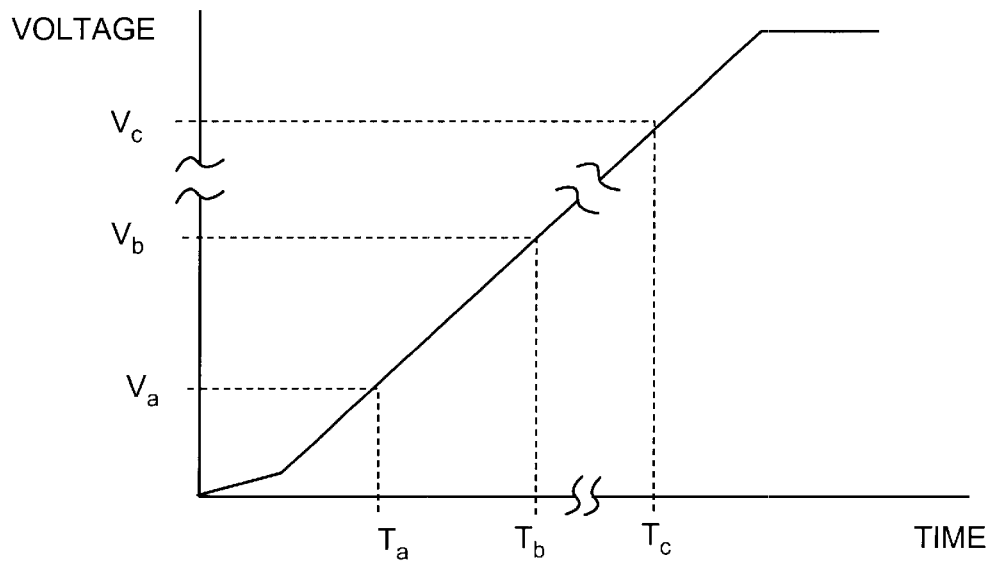
FIG. 5B is a graphical illustration of an embodiment of a power supply output according to the invention.

In another embodiment, the power supply 18 is a programmable power supply and charges each energy storage element 160, which are all the same value of capacitance, to different voltage levels. FIGS. 5A and 5B are a detailed representation of the charging circuit of such an embodiment. The switch control module 204 can be a microprocessor controller or a set of circuits made from discrete logic IC's (integrated circuits). The switches can be, for example a SCR (silicon controlled rectifier), IGBT (insulated gate bipolar transistor), MOSFET (metal oxide semiconductor field effect transistor), or BJT (bipolar junction transistor). The switches can be, for example, a SCR or IGBT, with the driving circuitry. When charging the energy storage elements 160 (FIG. 4), the power supply 18 rises in voltage over time, from zero to a predetermined level, as shown in FIG. 5B. The switch control module 204 works in coordination with the rising voltage, opening the switch for the respective channel when the desired voltage of that respective channel is reached. For example, on the graph, $V_a$ represents the voltage level to which the energy storage device 160a needs to be charged, $V_b$ represents the voltage level to which the energy storage device 160b needs to be charged and $V_c$ represents the voltage level to which the energy storage device 160c needs to be charged. At time $t_a$, the power supply 18 is outputting voltage $V_a$, at time $t_b$, the power supply 18 is outputting voltage $V_b$ and at time $t_c$, the power supply 18 is outputting voltage $V_c$. Thus, at time $t_a$, the switch control module 204 opens switch $S_a$ so that the energy storage element 160a of channel 1 is charged only to voltage $V_a$. Likewise, at time $t_b$, the switch control module 204 opens switch $S_b$ so that the energy storage element 160b of channel 2 is charged only to voltage $V_b$ and at time $t_c$, the switch control module 204 opens switch $S_c$ SO that the energy storage element 160c of channel n is charged only to voltage $V_c$. In another embodiment, there is no switch $S_c$ and the last energy storage element is charged to the maximum output voltage of the power supply 18. This maximum voltage can be made to have the value $V_c$.

Referring again to FIG. 4, the switching element 164 provides protection from discharging a subsequent energy storage element 160 into the power supply, when inhibited, or a previous energy storage element 160 that has previously discharged.

In the discharging networks 26B, each channel is a separate switching network and includes a switching element 168 (e.g., a SCR, MOSFET, BJT or IGBT, with the driving circuitry), and a switch filter 172 (e.g., a snubber). The switching element 168 remains open, electrically disconnecting the energy storage element 160 of the same channel from the flashlamp 30, while the energy storage element 160 is being charged by the power supply 18 through the switching element 164. Upon receiving a trigger signal from a synchronizer 182, the switching element 168 closes, electrically connecting the energy storage element 160 to the flashlamp 30. The energy is discharged from the energy storage element 160 of the same channel to the flashlamp 30 to create a high intensity light pulse. The switch filter 172 prevents false triggering of the switch 168 and prevents ringing when the switching element 168 is opened.

A synchronizer 182 synchronizes the closing of the switching elements 168a, 168b, 168c to create the desired spaced series of excitation pulses 104, 108, 116 (FIG. 3A) respectively. Upon receiving a trigger input signal, the synchronizer 182 inhibits the power supply 18 (e.g., commands the output to be 0 Volts) and closes the switching element 160a of channel one. The result is the creation of the first excitation pulse 104 (FIG. 3A). After a predetermined time delay, the synchronizer 182 closes the switching element 168b of channel two, creating the second excitation pulse 108 (FIG. 3A). This process is repeated until the predetermined number of excitation pulses in the spaced series has been created. In another embodiment, the synchronizer 182 also communicates with the tuning element 48. In coordination with the closing of each switching element 160, the synchronizer 182 sends a trigger signal to the tuning element to vary the wavelength of the micropulse of laser radiation corresponding to the applicable excitation pulse.

One advantage of the present invention is that the flashlamp-excited dye laser, as applied to selective photothermolysis, produces a beam of output pulses having a wavelength that is more optimal than other lasers. By keeping the energy in each micropulse 88, 92, 96, 100 below the threshold for generating purpura, the output beam 50 of the present invention can be used over a long effective pulse duration so that purpura is eliminated. In one embodiment, the parameters of pulse duration and fluence level are chosen such that the laser can effectively treat facial telangiectasia while eliminating purpura. The pulse duration 124, 128, 132, 136 of each micropulse is chosen to be greater than the thermal relaxation time of red blood cells and less than the thermal relaxation time of the target vessel. The thermal relaxation time of red blood cells is on the order of magnitude of 10 microseconds. By selecting the pulse duration 124, 128, 132, 136 of each micropulse to be longer than the thermal relaxation time of red blood cells, the heat is dissipated to surrounding fluid thereby preventing the red blood cells from exploding. Thus, the pulse duration 124, 128, 132, 136 is selected to be at least 10 microseconds. Denaturing of the target vessel is desired, so the long effective pulse duration 84 should be less than the thermal relaxation time of the target vessel. The thermal relaxation time of the target vessel varies with its size. For most target vessels, an appropriate long effective pulse duration 84 should be less than 40 milliseconds. To be relatively benign to the epidermis and reduce epidermal injury, the long effective pulse duration 84 should be greater than the thermal relaxation time of the epidermis (i.e., for the same reasoning as red blood cells). For most target vessels, it is believed that an appropriate long effective pulse duration 84 should be greater than 5 milliseconds. Thus, a long effective pulse duration 84 between 5 and 40 milliseconds is chosen for most target vessels.

In addition to the selection of the pulse duration, the time between micropulses is optimized. The time between micropulses, the amplitude of the energy, and duration of each micropulse affect the temperature profile of the target tissue. In known pulse lasers, the target tissue temperature rises steadily throughout the laser pulse. In a laser of the present invention, the temperature rise resembles discrete steps in temperature increase corresponding to each of the micropulses. The spacing between each micropulse can be selected to optimize the thermal profile for the greatest therapeutic efficacy. The spacing can also be optimized for combined use with cooling devices (e.g., a dynamic cooling device) as described in more detail below.

The amount of energy delivered is another important parameter for effective treatment. It is believed that to reduce or eliminate purpura, each single micropulse of laser energy should have a fluence at the skin of less than about 5 j/cm². The entire fluence delivered to the skin during the long effective pulse duration 84 (i.e., the sum of the fluence of each of the micropulses 88, 92, 96, 100) needs to exceed the minimum fluence level required for effective treatment. The effective therapeutic fluence necessary varies with the size of the target vessel and is, in general, between 7 and 30 j/cm².

In one exemplary embodiment, the invention is programmed to generate, upon the receipt of an input trigger signal, a spaced series of four micropulses of laser radiation 88, 92, 96, 100. Each micropulse has a pulse duration 124, 128, 132, 136 of 100 microseconds and a fluence of 3 j/cm² on target tissue. The series of micropulses 88, 92, 96, 100 are spaced so that from the start (i.e., rising edge) of the first micropulse 88 to the end (i.e., falling edge) of the last micropulse 100 is 10 milliseconds. As a result, the output beam delivers a fluence of 12 j/cm at the skin over an effective pulse duration 84 of 10 milliseconds.

In another exemplary embodiment, dynamic cooling of the epidermal layers of the skin occurs between each micropulse of laser radiation 88, 92, 96, 100. The cooling system may comprise a pressurized container of a low boiling point fluid. Cooling of the surface of the skin is accomplished by briefly spraying the skin with the fluid, which extracts heat from the skin on contact. The fluid extracts heat from the surface skin by the virtue of evaporative cooling. The fluid is sprayed on the skin between each micropulse of laser radiation. By spraying between the micropulses of the laser, scattering of the laser beam by the spray is avoided. The energy in each micropulse can be adjusted to the amount of cooling fluid applied prior to the micropulse. The combination of timing and cooling can be varied in any way to accomplish the treatment goals. In one embodiment, with a long period of cooling prior to the first micropulse 88, the first micropulse 88 can contain a higher energy level than the subsequent micropulses 92, 96, 100. In another embodiment, the first two micropulses 88, 92 are produced, the skin is cooled for a relatively long period (e.g., 5 milliseconds), and a third micropulse 96 is applied with a much higher amount of energy corresponding to the amount of cooling.

Experimental Results

A number of patients were treated to verify the benefits of the invention. Eleven adults (age eighteen or above) with Fitzpatrick skin types I–III and facial telangiectasias were used for the study. Two distinct areas of telangiectasias were identified on the faces of these volunteers. Pretreatment photographs were taken. One area was treated with the Candela SPTL Ib, a flashlamp pulsed dye laser with a wavelength of 589±2 nm and pulse duration of 450μsec, currently in use for treatment of vascular lesions. A second area was treated with a laser incorporating the principles of the invention. The laser generated an output beam having the same wavelength and an effective pulse duration of 20 msec.

Photographs were taken and/or assessments were made immediately after the procedure as well as 1 day, 4 days, 7 days, 14 days and 2 months post-procedure. At each of these time periods, the principal investigator evaluated the lesions on an analog scale for purpura/erythema and resolution of the vessel. Any evidence of hyperpigmentation, hypopigmentation, crusting, or skin textural change was also noted.

Evaluators compared the photos and/or assessments of treatments with the lasers described above of the 20 msec pulse duration and the 450 μsec pulse duration. The clearance performance (removal of the facial telangiectasias) was equivalent between the two lasers. The laser of the present invention demonstrated improved performance over the SPTL-Ib with regards to the occurrence and severity of purpura, pain and other side effects. A similar experiment was performed using a 10 millisecond long effective pulse and the results were the same.

Equivalents

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method of generating a pulsed output beam of laser radiation having a long effective pulse duration in a flashlamp-excited dye laser, the method comprising:
    a) providing a plurality of energy storage devices;
    b) charging each energy storage device to a different energy level using a single power supply;
    c) generating electronically a spaced series of excitation pulses by discharging the energy storage devices;
    d) driving the flashlamp-excited dye laser with the series of excitation pulses; and
    e) producing an output beam comprised of a series of micropulses of laser radiation.

2. The method of claim 1 wherein each pulse within the spaced series of excitation pulses has an increasing amplitude in coordination with an increasing lasing threshold for the flashlamp-excited dye laser.

3. The method of claim 1 wherein the effective pulse duration of the output beam is at least 5 milliseconds.

4. The method of claim 1 wherein each micropulse has a pulse duration of at least 10 microseconds.

5. The method of claim 1 wherein each micropulse has an energy level less than half of the total energy of the series of micropulses.

6. The method of claim 1 wherein the series of micropulses has a total energy greater than 1 Joule.

7. A method of generating a pulsed output beam of laser radiation having a long effective pulse duration in a flashlamp-excited dye laser, the method comprising:
    a) providing a plurality of energy storage devices;
    b) charging each energy storage device to a different energy level using at least one power supply;
    c) generating electronically a spaced series of excitation pulses by discharging the energy storage devices;

d) driving the flashlamp-excited dye laser with the series of excitation pulses;

e) producing an output beam comprised of a series of micropulses of laser radiation;

f) measuring a portion of the output beam transmitted through a wavelength filter; and g) adjusting a tuning element in response to the measured portion of the output beam.

8. A method of generating a pulsed output beam of laser radiation having a long effective pulse duration in a flashlamp-excited dye laser, the method comprising:

a) providing a plurality of energy storage devices;

b) charging each energy storage device to a different energy level using at least one power supply;

c) generating electronically a spaced series of excitation pulses by discharging the energy storage devices;

d) driving the flashlamp-excited dye laser with the series of excitation pulses;

e) producing an output beam comprised of a series of micropulses of laser radiation; and f) directing the output beam of laser radiation to a target using a flexible aiming device.

9. The method of claim 8 further comprising aligning the output beam of laser radiation with the target using an aiming beam.

10. The method of claim 9 further comprising using an aiming beam that has a wavelength in the green region.

11. A flashlamp-excited dye laser for producing a pulsed output beam of laser radiation having a long effective pulse duration, comprising:

a power supply configured to charge a plurality of energy storage devices to different energy levels;

a pulse forming module electrically connected to the power supply, the pulse forming module generating, in response to a trigger signal, a series of spaced excitation pulses by discharging the energy storage devices;

a flashlamp electrically receiving the series of spaced excitation pulses from the pulse forming module, the flashlamp producing a series of light pulses in response thereto; and a liquid dye medium receiving the series of light pulses from the flashlamp and, in response thereto, producing an output laser beam comprised of a series of spaced micropulses of laser radiation which, in combination, have a long effective pulse duration.

12. The flashlamp-excited dye laser of claim 11 wherein each pulse within the spaced series of excitation pulses is generated with increasing amplitude in coordination with an increasing lasing threshold for the flashlamp-excited dye laser.

13. The flashlamp-excited dye laser of claim 11 wherein the effective pulse duration of the output beam is at least 5 milliseconds.

14. The flashlamp-excited dye laser of claim 11 wherein each micropulse of laser radiation in the produced series has a pulse duration of at least 10 microseconds.

15. The flashlamp-excited dye laser of claim 11 wherein each micropulse has an energy level less than half of the total energy of the series of micropulses.

16. The flashlamp-excited dye laser of claim 11 wherein the series of micropulses has a total energy greater than 1 Joule.

* * * * *